United States Patent
Kim et al.

(10) Patent No.: US 9,896,203 B1
(45) Date of Patent: Feb. 20, 2018

(54) UNMANNED AERIAL VEHICLES, CHARGING SYSTEMS FOR THE SAME AND METHODS OF CHARGING THE SAME

(71) Applicants: Joung-Ho Kim, Daejeon (KR); Youngwoo Kim, Daejeon (KR)

(72) Inventors: Joung-Ho Kim, Daejeon (KR); Youngwoo Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 603 days.

(21) Appl. No.: 14/614,887

(22) Filed: Feb. 5, 2015

(30) Foreign Application Priority Data

Jul. 31, 2014 (KR) .................. 10-2014-0098327

(51) Int. Cl.
| | | |
|---|---|---|
| *B64C 29/02* | (2006.01) | |
| *B64C 39/02* | (2006.01) | |
| *B64D 27/24* | (2006.01) | |
| *B64C 25/52* | (2006.01) | |

(52) U.S. Cl.
CPC ............ *B64C 39/024* (2013.01); *B64C 25/52* (2013.01); *B64C 39/028* (2013.01); *B64D 27/24* (2013.01)

(58) Field of Classification Search
CPC ....... B64C 25/32; B64C 25/52; B64C 39/024; B64C 39/028; B64C 2025/325; B64C 2201/024; B64C 2201/042; B64C 2201/066; B64C 2201/108; B64C 2201/208; B64D 27/25
See application file for complete search history.

(56) References Cited

U.S. PATENT DOCUMENTS

2016/0144982 A1* 5/2016 Sugumaran ............. B64C 25/32
244/103 R

FOREIGN PATENT DOCUMENTS

KR 2010-0111263 A 10/2010

* cited by examiner

*Primary Examiner* — Nicholas McFall
(74) *Attorney, Agent, or Firm* — Daly, Crowley, Mofford & Durkee, LLP

(57) ABSTRACT

An unmanned aerial vehicle includes a body portion, a plurality of driving portions, a plurality of arms and first and second landing members. The body portion is formed at a center thereof, and the body portion includes an inner space defined by an upper plate, a lower plate and a plurality of supporting frames that connect the upper plate with the lower plate. The plurality of driving portions generate an impellent force for a flight. Each of the plurality of arms has one end connected to the body portion and the other end connected to one of the driving portions.

13 Claims, 6 Drawing Sheets

UNMANNED AERIAL VEHICLES, CHARGING SYSTEMS FOR THE SAME AND METHODS OF CHARGING THE SAME

CROSS-REFERENCE TO RELATED APPLICATION

This application claims priority under 35 USC § 119 to Korean Patent Application No. 10-2014-0098327, filed on Jul. 31, 2014 in the Korean Intellectual Property Office (KIPO), the contents of which are herein incorporated by reference in their entirety.

BACKGROUND

1. Technical Field

Example embodiments relate generally to aerial vehicles, and more particularly to unmanned aerial vehicles, charging system for the same and methods of charging the same.

This application is supported by a first research project named "magnetic field resonance based wireless energy transmission technique" having project serial number '2010-0029179', sponsored by a Ministry of Education in Korean government and a second research project named "vehicle power system integration" having project serial number '2010-0029374', sponsored by a Ministry of Education in Korean government.

2. Description of the Related Art

Recently, the need of an unmanned aerial vehicle in an environment where a person feels difficult to work has been increased. The need of an unmanned aerial vehicle in an environment where the unmanned aerial vehicle has been applied to wide areas, for example, the aerial vehicle can acquire video images in an unapproachable disaster area in the air, test power lines, or provide concealed information of the enemy in a battlefield, or it can perform a reconnaissance flight or a surveillance flight. In addition, the unmanned aerial vehicle is employed in delivery service. However, when the unmanned aerial vehicles are employed in various fields, moving range and moving time may have limits due to battery.

SUMMARY

Some example embodiments provide an unmanned aerial vehicle capable of reducing limitations of a battery.

Some example embodiments provide a charging system capable of wirelessly charging the unmanned aerial vehicle.

Some example embodiments provide a method of charging an unmanned aerial vehicle, capable of reducing limitations of a battery.

According to example embodiments, an unmanned aerial vehicle includes a body portion, a plurality of driving portions, a plurality of arms and first and second landing members. The body portion is formed at a center thereof, and the body portion includes an inner space defined by an upper plate, a lower plate and a plurality of supporting frames that connect the upper plate with the lower plate. The plurality of driving portions generate an impellent force for a flight. Each of the plurality of arms has one end connected to the body portion and the other end connected to one of the driving portions. The first and second landing members are connected to the lower plate, and the first and second landing members are opposed to each other and support the body portion such that the unmanned aerial vehicle lands on a ground with a predetermined height from the ground. The first landing member includes a first supporting portion and a second supporting portion. The first supporting portion is connected to the lower plate and the first supporting portion extends in a first direction. The second supporting portion is connected to the first supporting portion, and the second supporting portion extends in a second direction perpendicular to the first direction. The second landing member includes a third supporting portion and a fourth supporting portion. The third supporting portion is connected to the lower plate, and the third supporting portion extends in the first direction. The fourth supporting portion is connected to the third supporting portion, the fourth supporting portion extending in the second direction. A first reception coil that charges a rechargeable battery installed in the body portion is installed in the first leg portion and a second reception coil that charges the rechargeable battery is installed in the fourth leg portion.

In example embodiments, a first electromagnet may be mounted in the second leg portion, a second electromagnet may be mounted in the third leg portion and the first and second electromagnets may support landing of the unmanned aerial vehicle.

The inner space may include a converter coupled to the first and second reception coils and a charger coupled to the converter. The charge may charge the rechargeable battery.

Each of the driving portions may include a motor that receives a power from the rechargeable battery to generate a driving force and a propeller that receives the driving force from the motor and generates the impellent force.

The body portion may include a control module and a communication module therein. The control module may be coupled to the rechargeable battery and may control a flight operation of the unmanned aerial vehicle. The communication module may be coupled to the rechargeable battery and may communicate with an external control device to exchange data with the external control device.

In example embodiments, one or more global positioning system (GPS) sensors are installed in at least some of the arms.

The GPS sensors may support an alignment operation of the unmanned aerial vehicle when the unmanned aerial vehicle lands on a charging station.

According to example embodiments, a charging system for an unmanned aerial vehicle includes a charging station and an unmanned aerial vehicle. Transmission coils coupled to a power supply may be installed in the charging station. The unmanned aerial vehicle includes first and second reception coils, and the unmanned aerial vehicle receives a power from the charging station through magnetic coupling. The unmanned aerial vehicle includes a body portion, a plurality of driving portions, a plurality of arms and first and second landing members. The body portion is formed at a center thereof, and the body portion includes an inner space defined by an upper plate, a lower plate and a plurality of supporting frames that connect the upper plate with the lower plate. The plurality of driving portions generate an impellent force for a flight. Each of the plurality of arms has one end connected to the body portion and the other end connected to one of the driving portions. The first and second landing members are connected to the lower plate, and the first and second landing members are opposed to each other and support the body portion such that the unmanned aerial vehicle lands on a ground with a predetermined height from the ground. The first landing member includes a first supporting portion and a second supporting portion. The first supporting portion is connected to the lower plate and the first supporting portion extends in a first direction. The second supporting portion is connected to the first supporting portion, and the second supporting portion extends in a second direction perpendicular to the first direction. The second landing member includes a third supporting portion and a fourth supporting portion. The third supporting portion is connected to the lower plate, and the third supporting portion extends in the first direction. The fourth supporting portion is connected to the third supporting portion, the fourth supporting portion extending in the second direction. The first reception coil that charges a rechargeable battery installed in the body portion is installed in the first leg portion and the second reception coil that charges the rechargeable battery is installed in the fourth leg portion.

In example embodiments, a first electromagnet may be mounted in the second leg portion, a second electromagnet may be mounted in the third leg portion and the first and second electromagnets may be support landing of the unmanned aerial vehicle.

The charging station may include a first guiding rail in which a third electromagnet is mounted, a third guiding rail in which a fourth electromagnet is mounted, a second guiding rail connected to the first guiding rail and a fourth guiding rail connected to the third guiding rail. The third electromagnet may combine with the first electromagnet when the unmanned aerial vehicle lands on the charging station. The fourth electromagnet may combine with the second electromagnet when the unmanned aerial vehicle lands on the charging station. The second guiding rail may be in contact with the first leg portion when the unmanned aerial vehicle lands on the charging station. The fourth guiding rail may be in contact with the fourth leg portion when the unmanned aerial vehicle lands on the charging station.

A first shell may be installed in the second guiding rail, the first shell may have a cylindrical shape having a cavity therein, the first shell may include a first transmission coil therein, and the first shell may move toward the first leg portion to enfold the first reception coil after the unmanned aerial vehicle lands on the charging station. A second shell may be installed in the fourth guiding rail, the second shell may have a cylindrical shape having a cavity therein, the second shell may include a second transmission coil therein, and the second shell may move toward the fourth leg portion to enfold the second reception coil after the unmanned aerial vehicle lands on the charging station. The first and second shells may move after the first through fourth electromagnets are deactivated.

In example embodiments, one or more first global positioning system (GPS) sensors may be mounted on at least some of the arms and one or more second GPS sensors communicating with the first GPS sensors are mounted on the charging station.

According to example embodiments, a method of charging an unmanned aerial vehicle includes aligning the unmanned aerial vehicle with respect to a charging station by using one or more first global positioning system (GPS) sensors, landing the unmanned aerial vehicle on the charging station by activating first through fourth electromagnets, where the first and second electromagnets are mounted on the unmanned aerial vehicle and the third and fourth electromagnets are mounted on the charging station, deactivating the first through fourth electromagnets, moving a transmission coil toward a reception coil to charge a rechargeable battery in the unmanned aerial vehicle, where the transmission coil is installed in the charging station and the reception coil is installed in a landing member that supports the unmanned aerial vehicle.

Accordingly, according to example embodiments, reception coils are installed in landing members of an unmanned aerial vehicle to minimize weight of the reception coils, and the unmanned aerial vehicle includes electromagnets installed in the landing members. Therefore, the unmanned aerial vehicle may be charged with safety and robustness.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
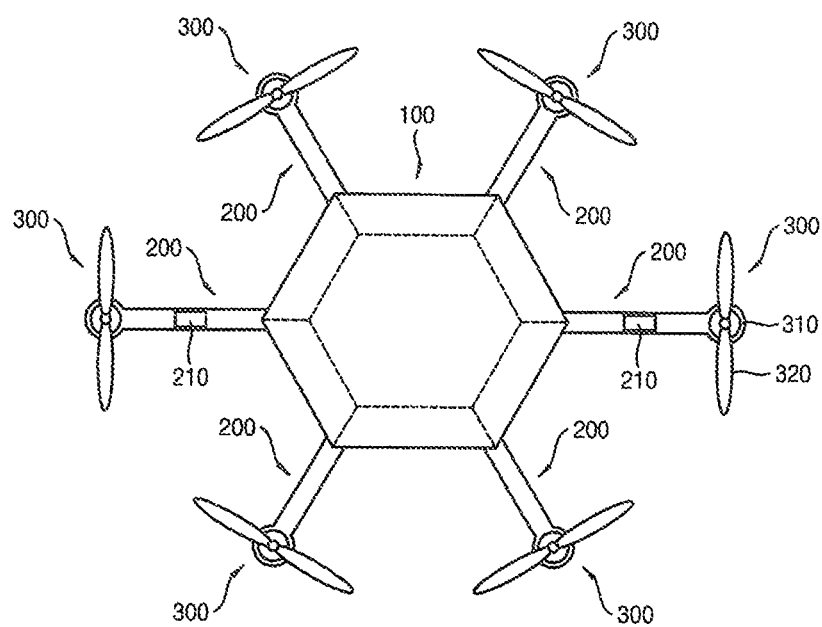
FIG. 1 is a plan view of an unmanned aerial vehicle according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, "unmanned aerial vehicle" refers to a aerial vehicle that can be remotely controlled by a person without boarding thereon, and in further detail, it includes a tri-rotor having three propellers, a quad-rotor having four propellers, a penta-rotor having five propellers, a hexa-rotor having six propellers, and an octo-rotor having eight propellers. Thus, the quad-rotor will be exemplarily described for convenience of description, but the present invention is not limited thereto, and it may be variously modified according to the number and configuration of the propellers.

Figure 2:
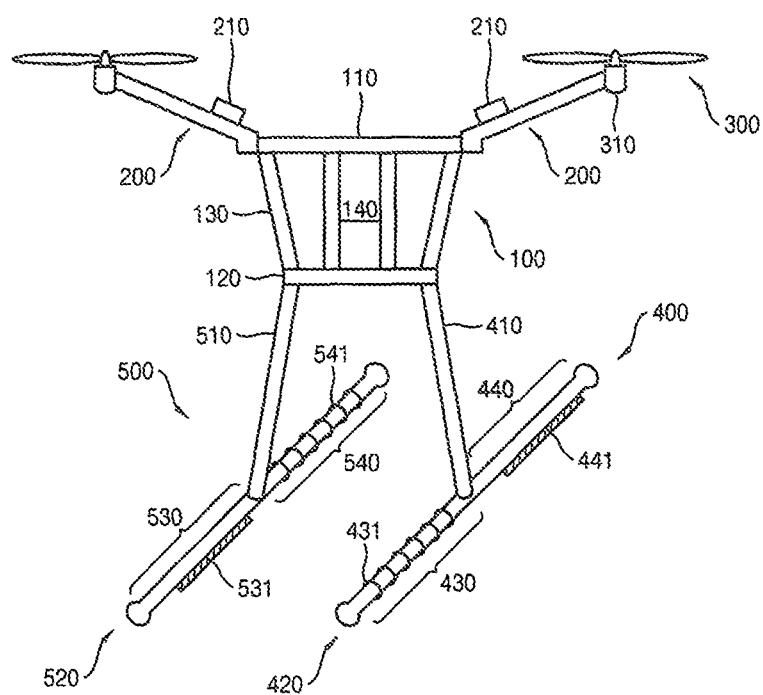
FIG. 2 is a perspective view of the unmanned aerial vehicle of FIG. 1 according to example embodiments.

FIG. 1 is a plan view of an unmanned aerial vehicle and FIG. 2 is a perspective view of the unmanned aerial vehicle of FIG. 1 according to example embodiments.

Referring to FIGS. 1 and 2, an unmanned aerial vehicle 10 may include a body portion 100, four arms 200, four driving portions 300, and first and second landing members 400 and 500. The driving portions 300 are respectively mounted at one ends of the respective arms 200 and the other ends of the respective arms 200 are coupled to the body portion 100 in the center of the vehicle.

The arms 200 and the body portion 100 may be coupled using a bolt and a nut, and any fastening elements can be used to fix and connect the two constituents 100 and 200.

The body portion 100 may include an inner space 140 defined by an upper plate 110, a lower plate 120 and a plurality of supporting frames 130 connecting the upper plate 110 with the lower plate 120. As will be described with reference to FIG. 3, the body portion 100 may include a converter 141, a charger 143, a rechargeable battery 145, a control module 151 and a communication module 153 which are installed in the inner space 140.

The upper plate 110 may have a shape such as a square, a hexagon, a octagon or a circle, and the lower plate 120 may have a shape corresponding to the upper plate 110.

Each of the arms 200 may have a long rectangular shape, and may have one end coupled to the body portion 110 and the other end at which each of the driving portions 300 is mounted. The other end of each arm 300 may have a circular shape. One or more global positioning system (GPS) sensors 210 may be at least some of the arms 200 and the GPS sensors 210 may support landing of the unmanned aerial vehicle 10.

Each of the driving portions 300 may include a motor 310 and a propeller 320. The motor 310 converts electrical energy to mechanical energy and the propeller 320 receives driving force of the motor 310 to generate impellent force of the unmanned aerial vehicle 10 for a flight. Although not illustrated, each of the driving portions 300 may further include a safety cover mounted on the propeller 320. The safety cover may protects the propeller 320 from peripheral obstacles without interfering operation of the propeller 320 and simultaneously protects people around the propeller 320.

The first and second landing members 400 and 500 are connected to the lower plate 120, and the first and second landing members 400 and 500 are opposed to each other and support the body portion 100 such that the unmanned aerial vehicle 10 lands on a ground with a predetermined height from the ground. The first landing member 400 may include a first supporting portion 410 and a second supporting portion 420. The first supporting portion 410 is connected to the lower plate 120, and the first supporting portion 410 extends in a first direction. The second supporting portion 420 is connected to the first supporting portion 410, and the second supporting portion 420 extends in a second direction perpendicular to the first direction. The second landing member 500 may include a third supporting portion 510 and a fourth supporting portion 520. The third supporting portion 510 is connected to the lower plate 120, and the third supporting portion 510 extends in the first direction. The fourth supporting portion 520 is connected to the third supporting portion 510, and the fourth supporting portion 520 extends in the second direction.

The second supporting portion 420 includes first and second leg portions 430 and 440 divided with respect to the first supporting portion 410 and the fourth supporting portion 520 includes third and fourth leg portions 530 and 540 divided with respect to the third supporting portion 510. A first reception coil 431 is in the first leg portion 430, a first electromagnet 441 is mounted on the second leg portion 440, a second electromagnet 531 is mounted on the third leg portion 530 and a second reception coil 541 is installed in the fourth leg portion 540.

In addition, although not illustrated, a delivery box housing a delivery article may be coupled to the lower plate 120 between the first and second landing members 400 and 500. In this case, the unmanned aerial vehicle 100 may be used for delivering articles to clients.

Figure 3:
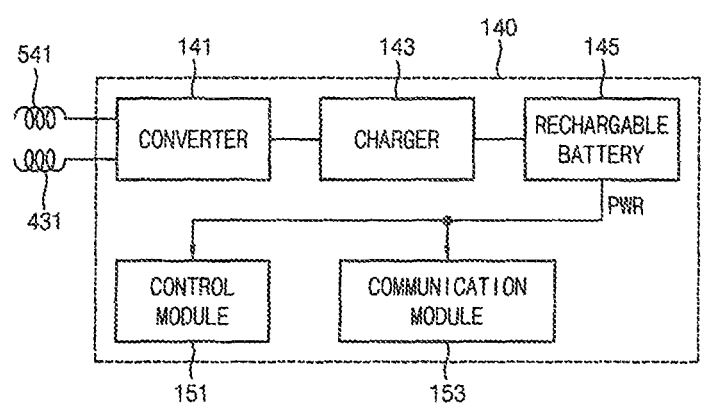
FIG. 3 illustrates the inner space of the body portion in FIGS. 1 and 2 according to example embodiments.

FIG. 3 illustrates the inner space of the body portion in FIGS. 1 and 2 according to example embodiments.

Referring to FIG. 3, the inner space 140 may include a converter 141, a charger 143, a rechargeable battery 145, a control module 151 and a communication module 153 therein.

The converter 141 is coupled to the first and second reception coils 431 and 541, and may convert induced voltage to a direct current (DC) voltage. The charger 143 may charge the rechargeable battery 145 based on the DC voltage. The rechargeable battery 145 may provide a power PWR to the control module 151, the communication module 153 and each of the motors 310 in FIG. 2. The control module 151 may control a flight operation of the unmanned aerial vehicle 10. The communication module 153 may communicate with an external control device to exchange data with the external control device.

Figure 4:
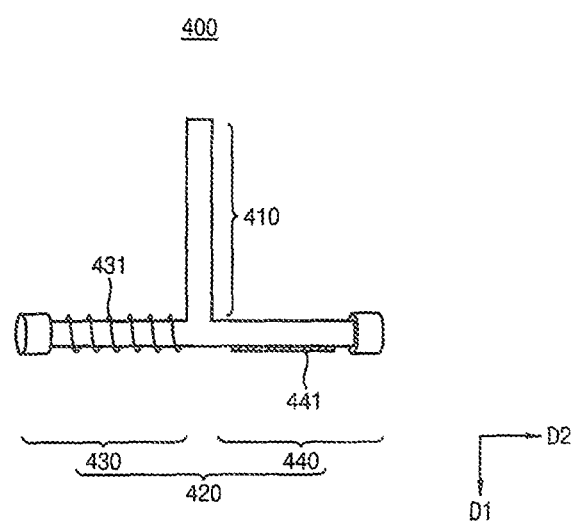
FIG. 4 illustrates the first landing member in the unmanned aerial vehicle of FIG. 2 according to example embodiments

FIG. 4 illustrates the first landing member in the unmanned aerial vehicle of FIG. 2 according to example embodiments.

Referring to FIG. 4, the first landing member 400 includes the first supporting portion 410 and the second supporting portion 420. The first supporting portion 410 is connected to the lower plate 120, and the first supporting portion 410 extends in a first direction D1. The second supporting portion 420 is connected to the first supporting portion 410, and the second supporting portion 420 extends in a second direction D2 perpendicular to the first direction D1. The second supporting portion 420 includes the first and second leg portions 430 and 440 divided with respect to the first supporting portion 410. The first reception coil 431 that charges the rechargeable battery 145 is in the first leg portion 430 and the first electromagnet 441 that supports landing of the unmanned aerial vehicle 10 is mounted on the second leg portion 440. The first reception coil 431 may be coupled to the converter 141 in FIG. 3.

The second landing member 500 in FIG. 2 may have architecture corresponding to the first landing member 400, and the second reception coil 541 installed in the fourth leg portion 540 is electrically coupled to the converter 141 in FIG. 3.

Figure 5:
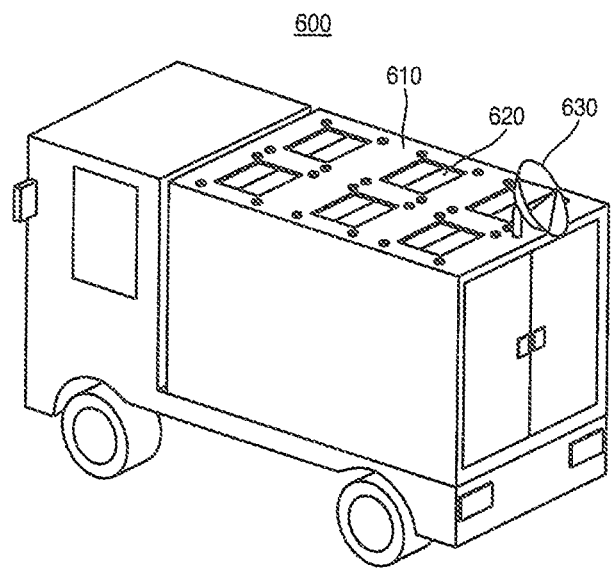
FIG. 5 is a perspective view of a portable charging and housing vehicle according to example embodiments.
Figure 6:
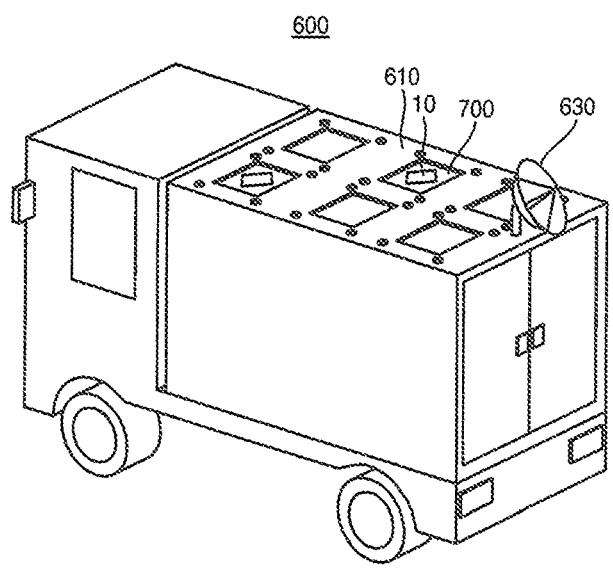
FIG. 6 illustrates that the unmanned aerial vehicle lands on the vehicle of FIG. 5.

FIG. 5 is a perspective view of a portable charging and housing vehicle and FIG. 6 illustrates that the unmanned aerial vehicle lands on the vehicle of FIG. 5.

Referring to FIGS. 5 and 6, a charging station 700 and an opening and closing unit 620 are installed on an upper landing portion 610 of a portable charging and housing vehicle (or a container vehicle) 600. The unmanned aerial vehicle 10 may land on the charging station 700 and may be housed and charged in the charging station 700. The charging station 700 may move the unmanned aerial vehicle 10 upwards or downwards. A satellite antenna 630 may be mounted on the upper landing portion 610.

Figure 7:
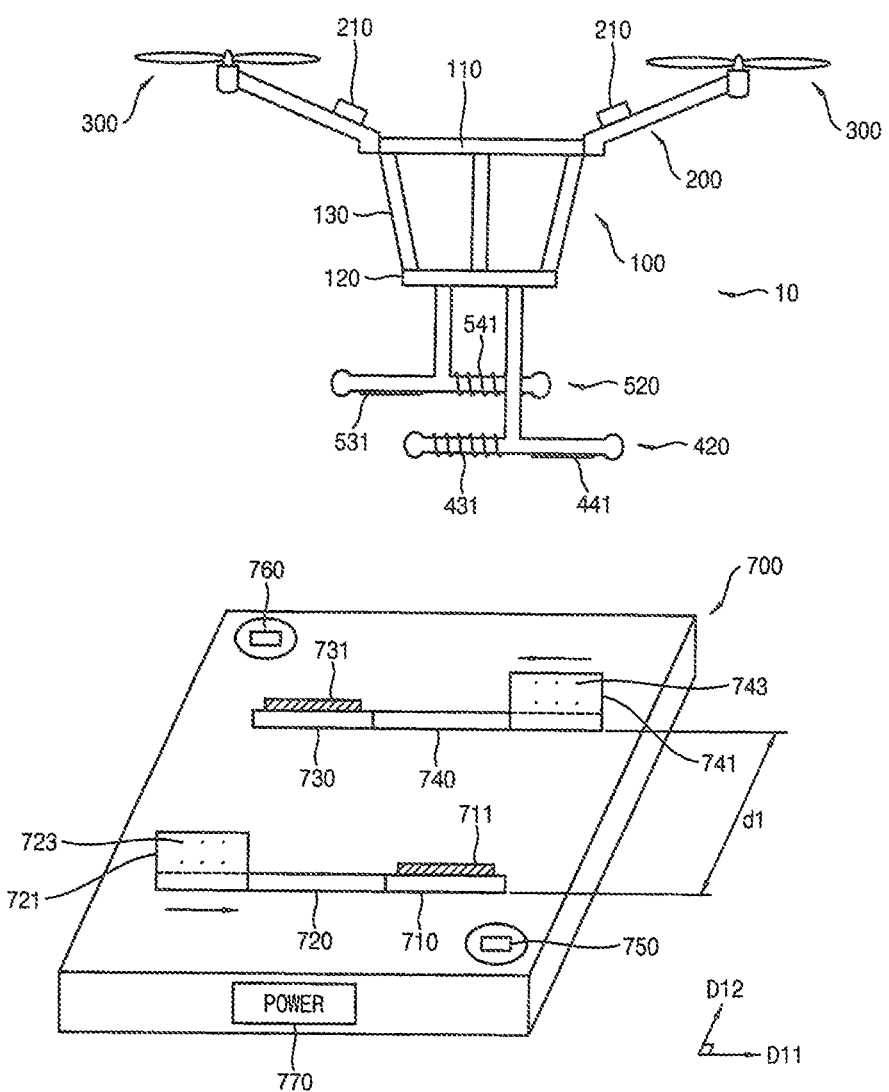
FIG. 7 illustrates the charging station and the unmanned aerial vehicle in FIG. 6 according to example embodiments.

FIG. 7 illustrates the charging station and the unmanned aerial vehicle in FIG. 6 according to example embodiments.

Referring to FIG. 7, the charging station 700 may include a power supply 770 on the inside and may include GPS sensors 750 and 760, and first through fourth guiding rails 710, 720, 730 and 740 on the surface thereof. The first and second guiding rails 710 and 720 are connected to each other and extend in a first direction D11. The third and fourth guiding rails 730 and 730 are connected to each other and extend in the first direction Dli spaced apart from the first and second guiding rails 710 and 720 by a distance d1 in a second direction D12 perpendicular to the first direction D11.

A third electromagnet 711 is mounted on the first guiding rail 710, and a third electromagnet 731 is mounted on the third guiding rail 730. A first shell 721 is installed in the second guiding rail 720, the first shell has 723 a cylindrical shape having a cavity therein, the first shell 721 includes a first transmission coil 723 therein, and the first shell 721 moves toward the first leg portion 431 to enfold the first reception coil 431 after the unmanned aerial vehicle 10 lands on the charging station 700. A second shell 741 is installed in the fourth guiding rail 740, the second shell 741 has a cylindrical shape having a cavity therein, the second shell 741 includes a second transmission coil 743 therein, and the second shell 741 moves toward the fourth leg portion 540 to enfold the second reception coil 541 after the unmanned aerial vehicle 10 lands on the charging station 700. The first and second transmission coils 723 and 743 are electrically coupled to the power supply 770 and the power supply 770 may apply a power to the first and second transmission coils 723 and 743 after the unmanned aerial vehicle 10 lands on the charging station 700 and the first through fourth electromagnets 441, 531, 711 and 731 are deactivated.

When the unmanned aerial vehicle 10 approaches the charging station 700 for landing, the GPS sensors 210 communicate with the GPS sensors 750 and 760 such that the second and fourth supporting portions 420 and 520 of the unmanned aerial vehicle 10 is aligned along the first direction D11. After the second and fourth supporting portions 420 and 520 of the unmanned aerial vehicle 10 is aligned along the first direction D11, the first electromagnet 441 interacts with the third electromagnet 711 and the second electromagnet 531 interacts with the fourth electromagnet 731, and thus the unmanned aerial vehicle 10 lands on the charging station 700. Therefore, the first leg portion 430 combines with the second guiding rail 720 and the fourth leg portion 540 combines with the fourth guiding rail 740. After the first leg portion 430 combines with the second guiding rail 720 and the fourth leg portion 540 combines with the fourth guiding rail 740, the first through fourth electromagnets 441, 531, 711 and 731 are deactivated and the first shell 721 moves toward the first leg portion 430 to enfold the first reception coil 431 and the second shell 741 moves toward the fourth leg portion 540 to enfold the second reception coil 541. The power supply 770 provides the power to the first and second transmission coils 723 and 743. The first reception coil 431 wireless charges the rechargeable battery 145 through magnetic coupling with the first transmission coil 723 and the second reception coil 541 wireless charges the rechargeable battery 145 through magnetic coupling with the second transmission coil 743.

Figure 8:
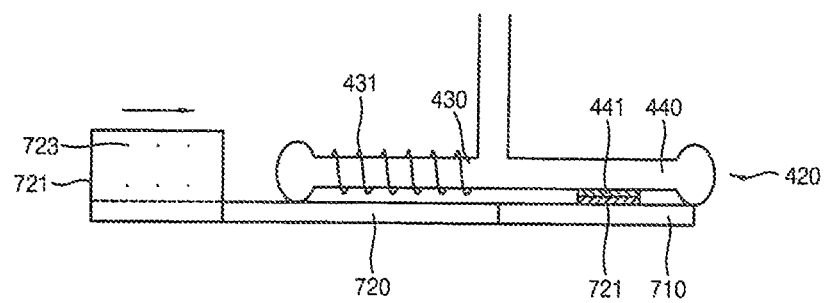
FIG. 8 illustrates that the first shell moves toward the first leg portion in FIG. 7.

FIG. 8 illustrates that the first shell moves toward the first leg portion in FIG. 7.

After the first and third electromagnets 441 and 711 interact each other and the first and third electromagnets 441 and 711 combine with respect to each other, the first shell 721 having the first transmission coil 723 therein moves toward the first leg portion 430 to enfold the first reception coil 431. After the first shell 721 enfolds the first reception coil 431, the current is applied to the first transmission coil 723 to charge the rechargeable battery 145. When the rechargeable battery 145 is charged according to above-mentioned description, charging efficiency may increase and leakage of electromagnetic wave may be prevented because a distance between the first transmission coil 723 and the first reception coil 431 is close to each other. In addition, the first and third electromagnets 441 and 711 are deactivated when the rechargeable battery 145 is being charged such to minimize interference.

Figure 9:
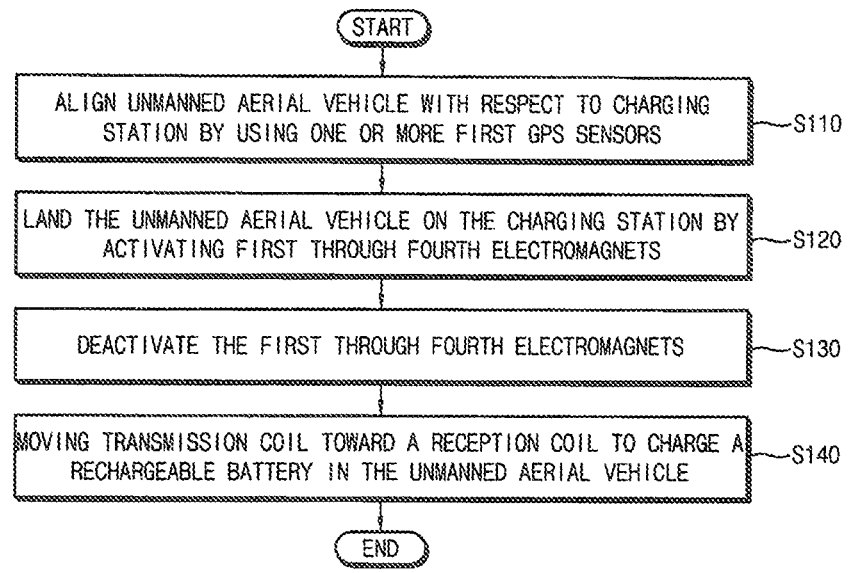
FIG. 9 is a flowchart illustrating a method of charging an unmanned aerial vehicle according to example embodiments.

FIG. 9 is a flowchart illustrating a method of charging an unmanned aerial vehicle according to example embodiments.

Referring to FIGS. 1 through 9, in a method of charging an unmanned aerial vehicle, the unmanned aerial vehicle 10 is aligned along the guiding rails 710, 720, 730 and 740 by using GPS sensors 210, 750 and 760 (S110). The unmanned aerial vehicle 10 is landed on the charging station 700 by activating first through fourth electromagnets 441, 531, 711 and 731, where the first and second electromagnets 441 and 531 are mounted on the landing members 400 and 500 of the unmanned aerial vehicle 10 and the third and fourth electromagnets 711 and 731 are mounted on the guiding rails 710 and 730 of the charging station 700 (S120). The first through fourth electromagnets 441, 531, 711 and 731 are deactivated (S130). The transmission coils 723 and 743 in the charging station 700 are moved toward the reception coils in the unmanned aerial vehicle 10 respectively and the current is applied to the transmission coils 723 and 743 to charge the rechargeable battery 145 (S140).

Example embodiments may be applied to various delivery system and obtaining information in disaster area, which use unmanned aerial vehicles.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. An unmanned aerial vehicle comprising:
a body portion formed at a center thereof, wherein the body portion includes an inner space defined by an upper plate, a lower plate and a plurality of supporting frames that connect the upper plate with the lower plate;
a plurality of driving portions that generate an impellent force for a flight;
a plurality of arms, each having one end connected to the body portion and the other end connected to one of the driving portions; and
first and second landing members connected to the lower plate, wherein the first and second landing members are opposed to each other and support the body portion such that the unmanned aerial vehicle lands on a ground with a predetermined height from the ground,
wherein the first landing member comprises:
a first supporting portion connected to the lower plate, the first supporting portion extending in a first direction; and
a second supporting portion connected to the first supporting portion, the second supporting portion extending in a second direction perpendicular to the first direction,
wherein the second landing member comprises:
a third supporting portion connected to the lower plate, the third supporting portion extending in the first direction; and
a fourth supporting portion connected to the third supporting portion, the fourth supporting portion extending in the second direction,
wherein the second supporting portion includes first and second leg portions divided with respect to the first supporting portion and the fourth supporting portion includes third and fourth leg portions divided with respect to the third supporting portion, and
wherein a first reception coil that charges a rechargeable battery installed in the body portion is installed in the first leg portion and a second reception coil that charges the rechargeable battery is installed in the fourth leg portion.

2. The unmanned aerial vehicle of claim 1, wherein a first electromagnet is mounted in the second leg portion, a second electromagnet is mounted in the third leg portion and the first and second electromagnets support landing of the unmanned aerial vehicle.

3. The unmanned aerial vehicle of claim 1, wherein the inner space comprises:
a converter coupled to the first and second reception coils; and
a charger coupled to the converter, the charge configured to charge the rechargeable battery.

4. The unmanned aerial vehicle of claim 3, wherein each of the driving portions comprises:
a motor that receives a power from the rechargeable battery to generate a driving force; and
a propeller that receives the driving force from the motor and generates the impellent force.

5. The unmanned aerial vehicle of claim 3, wherein the body portion comprises:
a control module therein, wherein the control module is coupled to the rechargeable battery and controls a flight operation of the unmanned aerial vehicle; and
a communication module therein, wherein the communication module is coupled to the rechargeable battery and communicates with an external control device to exchange data with the external control device.

6. The unmanned aerial vehicle of claim 1, wherein one or more global positioning system (GPS) sensors are installed in at least some of the arms.

7. The unmanned aerial vehicle of claim 6, wherein the GPS sensors support an alignment operation of the unmanned aerial vehicle when the unmanned aerial vehicle lands on a charging station.

8. A charging system for an unmanned aerial vehicle, the charging system comprising:
a charging station in which transmission coils coupled to a power supply are installed; and
an unmanned aerial vehicle that includes first and second reception coils, the unmanned aerial vehicle receiving a power from the charging station through magnetic coupling, wherein the unmanned aerial vehicle comprises:
a body portion formed at a center thereof, wherein the body portion includes an inner space defined by an upper plate, a lower plate and a plurality of supporting frames that connect the upper plate with the lower plate;
a plurality of driving portions that generate an impellent force for a flight;
a plurality of arms, each having one end connected to the body portion and the other end connected to one of the driving portions; and
first and second landing members connected to the lower plate, wherein the first and second landing members are opposed to each other and support the body portion such that the unmanned aerial vehicle lands on a ground with a predetermined height from the ground,
wherein the first landing member comprises:
a first supporting portion connected to the lower plate, the first supporting portion extending in a first direction; and
a second supporting portion connected to the first supporting portion, the second supporting portion extending in a second direction perpendicular to the first direction,
wherein the second landing member comprises:
a third supporting portion connected to the lower plate, the third supporting portion extending in the first direction; and
a fourth supporting portion connected to the third supporting portion, the fourth supporting portion extending in the second direction,
wherein the second supporting portion includes first and second leg portions divided with respect to the first supporting portion and the fourth portion includes third and fourth leg portions divided with respect to the third supporting portion, and
wherein the first reception coil that charges a rechargeable battery installed in the body portion is installed in the first leg portion and the second reception coil that charges the rechargeable battery is installed in the fourth leg portion.

9. The charging system of claim 8, wherein a first electromagnet is mounted in the second leg portion, a second electromagnet is mounted in the third leg portion and the first and second electromagnets support landing of the unmanned aerial vehicle.

10. The charging system of claim 9, wherein the charging station comprises:
   a first guiding rail in which a third electromagnet is mounted, wherein the third electromagnet combines with the first electromagnet when the unmanned aerial vehicle lands on the charging station;
   a third guiding rail in which a fourth electromagnet is mounted, wherein the fourth electromagnet combines with the second electromagnet when the unmanned aerial vehicle lands on the charging station;
   a second guiding rail connected to the first guiding rail, wherein the second guiding rail is in contact with the first leg portion when the unmanned aerial vehicle lands on the charging station; and
   a fourth guiding rail connected to the third guiding rail, wherein the fourth guiding rail is in contact with the fourth leg portion when the unmanned aerial vehicle lands on the charging station.

11. The charging system of claim 10,
   wherein a first shell is installed in the second guiding rail, the first shell has a cylindrical shape having a cavity therein, the first shell includes a first transmission coil therein, and the first shell moves toward the first leg portion to enfold the first reception coil after the unmanned aerial vehicle lands on the charging station,
   wherein a second shell is installed in the fourth guiding rail, the second shell has a cylindrical shape having a cavity therein, the second shell includes a second transmission coil therein, and the second shell moves toward the fourth leg portion to enfold the second reception coil after the unmanned aerial vehicle lands on the charging station, and
   wherein the first and second shells move after the first through fourth electromagnets are deactivated.

12. The charging system of claim 8, wherein one or more first global positioning system (GPS) sensors are mounted on at least some of the arms and one or more second GPS sensors communicating with the first GPS sensors are mounted on the charging station.

13. A method of charging an unmanned aerial vehicle, the method comprising:
   aligning the unmanned aerial vehicle with respect to a charging station by using one or more first global positioning system (GPS) sensors;
   landing the unmanned aerial vehicle on the charging station by activating first through fourth electromagnets, wherein the first and second electromagnets are mounted on the unmanned aerial vehicle and the third and fourth electromagnets are mounted on the charging station;
   deactivating the first through fourth electromagnets; and
   moving a transmission coil toward a reception coil to charge a rechargeable battery in the unmanned aerial vehicle, wherein the transmission coil is installed in the charging station and the reception coil is installed in a landing member that supports the unmanned aerial vehicle.

* * * * *